US006385860B1

(12) United States Patent

MacWilliams et al.

(10) Patent No.: US 6,385,860 B1
(45) Date of Patent: May 14, 2002

(54) LABEL AND METHOD FOR APPLYING

(75) Inventors: Steven MacWilliams, Fullerton; Arthur Brown, Mission Viejo, both of CA (US)

(73) Assignee: Smead Manufacturing Company, Hastings, MN (US)

(*) Notice: Subject to any disclaimer, the term of this patent is extended or adjusted under 35 U.S.C. 154(b) by 0 days.

(21) Appl. No.: 09/516,683

(22) Filed: Mar. 1, 2000

(51) Int. Cl.[7] ............................ G01B 5/25; B42D 15/00
(52) U.S. Cl. ............................ 33/613; 33/645; 283/101
(58) Field of Search .......................... 33/613, 623, 645; 156/DIG. 2, DIG. 3; 283/100, 101

(56) References Cited

U.S. PATENT DOCUMENTS

| | | | | | |
|---|---|---|---|---|---|
| 2,238,106 | A | * | 4/1941 | Fleischer | 33/623 |
| 2,609,613 | A | * | 9/1952 | Capers | 33/623 |
| 3,691,662 | A | | 9/1972 | Cunningham | 40/23 A |
| 3,937,493 | A | | 2/1976 | Fasbender | 283/41 |
| 4,369,582 | A | * | 1/1983 | Pfeffer | 33/613 |
| 4,785,549 | A | * | 11/1988 | Brown et al. | 33/623 |
| 5,077,001 | A | | 12/1991 | Makowka | 383/5 |
| 5,209,698 | A | * | 5/1993 | Dolan | 283/101 |
| 5,236,766 | A | | 8/1993 | Cole | 428/194 |
| 5,503,487 | A | | 4/1996 | Ong | 402/79 |
| 5,622,758 | A | | 4/1997 | Hollis et al. | 428/40.1 |
| 5,680,709 | A | * | 10/1997 | Stone | 33/613 |
| 5,792,536 | A | | 8/1998 | Whipp | 428/40.1 |
| 5,836,622 | A | | 11/1998 | Fabel | 283/62 |
| 5,842,722 | A | | 12/1998 | Carlson | 283/107 |
| 5,894,676 | A | * | 4/1999 | DiGiovanni | 33/645 |
| 5,895,075 | A | | 4/1999 | Edwards | 283/81 |
| 6,257,624 | B1 | | 7/2001 | Fabel | 283/62 |

* cited by examiner

*Primary Examiner*—G. Bradley Bennett
(74) *Attorney, Agent, or Firm*—Schwegman, Lundberg, Woessner, Kluth. P.A.

(57) ABSTRACT

A method and means for consistently applying and aligning labels is provided. A label form includes a label section having at least one tactile alignment guidance feature and a backing member removably attached to the label section. In one embodiment, the backing member having a first side and a second side, each removable from the label section independently and when the first side is removed from the label section, the alignment guidance feature on the label section is exposed so that the alignment guidance feature can be aligned with a corresponding alignment guidance feature on a stock member, such as a folder.

41 Claims, 4 Drawing Sheets

LABEL AND METHOD FOR APPLYING

FIELD OF THE INVENTION

This invention relates to the field of labels, and more specifically to labels for applying to file folders, folder tabs, and other stock members.

BACKGROUND

In many document filing systems, labels are applied to file folders so that the label is located along an edge of one of the folder tabs. The labels are readily visible when the file folders are stored in cabinets or on shelves.

The application of the labels to the folder tab, however, is problematic. This is because the user cannot consistently align or fold the label onto the folder in an exact position so that the correct portion of the label is on each side of the folder tab. When labeled folders are put in drawers or on a shelf it is desirable for all the indicia on each label to align from one folder to the next. This is so that when thousands of files are being labeled and stored any misfiles can be instantly caught by sight. For such a system to work efficiently, the labels must be consistently aligned.

In the past, most techniques to align the label on the folder include hash-marks or other lines printed on the label so that the user must visually determine where the label is to be placed and folded. Such a system leads to inconsistent alignment, since each person applying the labels may have a different idea as to whether a label is correctly aligned. The present techniques are also time consuming and take a modicum of skill. Another problem with present labels is that they have a tendency to curl when removed from a backing sheet.

Thus, there is a need for a label system for assisting the user to consistently align labels.

SUMMARY OF THE INVENTION

The present invention provides a label form and a method for consistently applying and aligning labels. In one aspect of the present invention, a label form is provided. The label form includes a label section having at least one tactile alignment guidance feature for providing guidance in aligning and applying the label to a stock member. In one embodiment, a backing member is removably attached to the label member. The backing member has a first side and a second side, each side removable from the label section independently. When the first side is removed from the label section, the alignment guidance feature on the label section is exposed so that the alignment guidance feature can be aligned with a corresponding alignment guidance feature on a folder or other stock member.

In another aspect, the present invention provides a labeling system. The labeling system includes a label section having a tactile alignment guidance feature and a stock member, such as a folder, having a corresponding tactile alignment guidance feature, so that the label section alignment guidance feature can be aligned with the corresponding alignment guidance feature on the folder.

Advantageously, the present invention provides a label, system, and method for assisting a user in quickly and consistently aligning labels.

DESCRIPTION

In the following detailed description, reference is made to the accompanying drawings that form a part hereof, and in which are shown by way of illustration specific embodiments in which the invention may be practiced. It is understood that other embodiments may be utilized and structural changes may be made without departing from the scope of the present invention.

The description herein will discuss a novel label form and the application of a label to a file folder. However, it is to be understood that the discussion is merely exemplary and is not meant to limit the invention to document storage file folders and the like, and that many other uses and applications are within the scope of the present invention.

Figure 1:
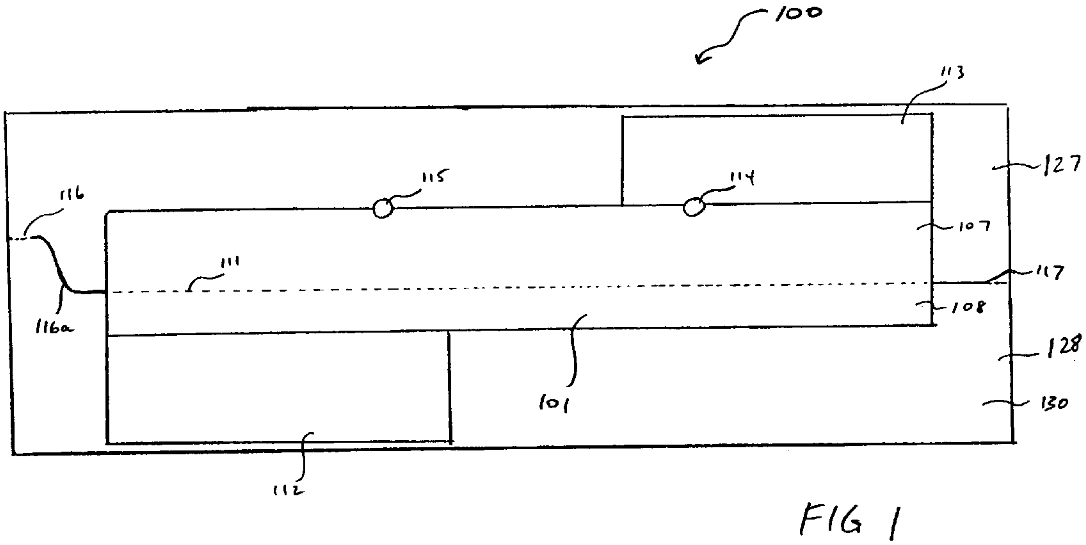
FIG. 1 shows a top view of one embodiment of a label form according to the present invention.
Figure 2:
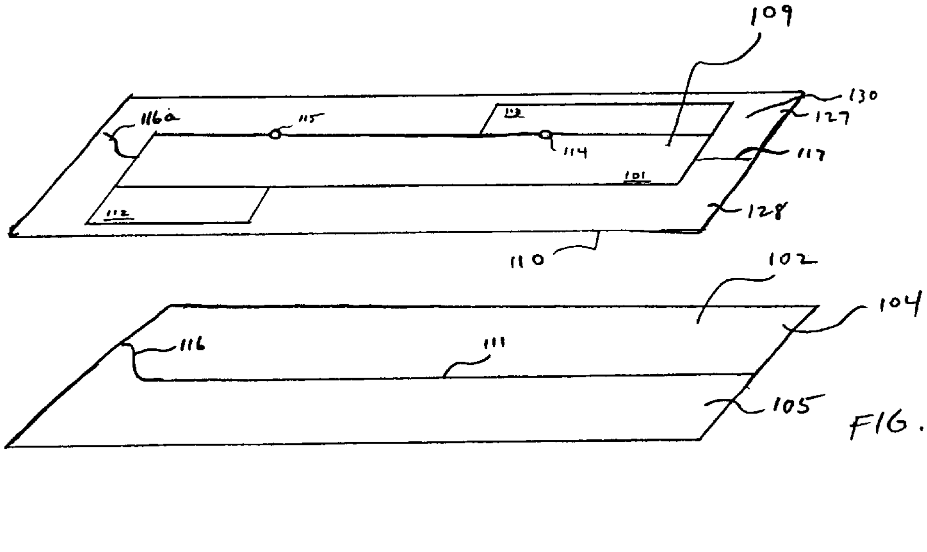
FIG. 2 is an exploded isometric view of the label form of FIG. 1.

FIGS. 1 and 2 show one exemplary embodiment of a label form 100. Label form 100 includes a main label section 130 and a backing sheet or backing member 102. Label section 130 is cut to provide one or more label members, such as label members 101, 112, and 113. Label section 130 includes a top side 109 adapted for being printed upon and a bottom side 110 having an adhesive, such as a pressure sensitive adhesive, applied thereon. Label section 130 can be made from a variety of materials such as paper, vinyl, or other plastic composite material. In one embodiment, label form 100 is a piggyback label form in which label member 101 is the only part of the label section attached to backing sheet 102. Moreover, exemplary label members 112 and 113 are optional and are only shown as one example of a possible label lay-out. In the exemplary embodiment, label form 100 has dimensions of approximately 4.25 inches by 9.5 inches. This provides a standard size for using the label form in a standard printer. Alternatively, the label form can be other sizes, depending on the type of printer being used or on the size of label needed.

In the exemplary embodiment, label member 101 is approximately centered within label section 130. Label section 130 has generally two portions, a first portion 127 and a second portion 128. In one embodiment, first portion 127 is approximately half of label section 130 and second portion 128 is the other half of label section 130. Label member 101 will also be described as having two portions, a first portion 107 and a second portion 108. In one embodiment, first portion 107 is approximately half of label member 101 and second portion 108 is the other half of label member. 130. It is noted that first and second portion are being used as descriptive terms and are not to be construed as limiting the present invention.

Label section 130 also includes at least one tactile alignment guidance feature. In the exemplary embodiment, the tactile alignment guidance features are a notch 114 and/or a notch 115 cut into an edge of label member 101. In the exemplary embodiment, notches 114 and 115 are female members for providing visual and tactile guidance for aligning label member 101 when it is applied to a stock member, such as a file folder or envelope, which includes corresponding and mating male alignment features, as will be described below. More or fewer alignment features can be provided than shown in the exemplary embodiment, depending on the application. Moreover, the shape of the alignment feature can be varied. For instance, notches 114 and 115 can be semi-circles, triangles, or other shapes that provide tactile and visual guidance. Although the exemplary embodiment shows the label section tactile alignment features to be female members, those skilled in the art will appreciate that the label section alignment features can be male members in some embodiments and that the stock member can include either male or female members depending on the design.

Label section 130 is removably attached to backing member 102. In the exemplary embodiment, backing member 102 includes two sides, a first side 104 and a second side 105. First side 104 and second side 105 are both attached to label section 130. Second side 105 of backing member 102 is attached to second portion 128 of label section 130 and attached to second portion 108 of label member 101. First side 104 of backing member 102 is attached to first portion 127 of label section 130 and first portion 107 of label member 101. As discussed above, first and second side are being used as descriptive terms and are not to be construed as limiting the present invention. As is known in the art, the surface of backing member 102 is comprised of a material so that adhesive bottom side 110 of label section 130 is easily removable from the backing member.

First side 104 and second side 105 of the backing member are separated by a split-crack perforation 111. Perforation 111 allows half of the backing member to be peeled off of label section 130 and label member 101 at a time. In the exemplary embodiment, the perforation includes a tactile alignment guidance feature, a contoured cut 116. Contoured cut 116 is designed to correspond to the contour of an end-tab folder, to provide for tactile and visual guidance in applying the label, as will be described below. Although the exemplary embodiment shows label form 100 having both notches and a contoured cut, either alignment feature can be used independently and can be incorporated into a label form by itself or in tandem.

As can be seen best in FIG. 2, label section 130 includes cuts 117 and 116*a*. These cuts follow and correspond to split crack perforation 111 and allow for easy removal of first side 104 of the backing member so that label member 101 is exposed when first side 104 is removed, since first portion 127 is removed at the same time. In the exemplary embodiment of FIGS. 1 and 2, cuts 116*a* and 117 do not reach the edges of label section 130. This helps keep label form 100 together when the label is being printed on a printer. Alternatively, cuts 116*a* and 117 could reach the edges and perforation 111 of the backing member could be cut just short of the edges of the backing member. It is also noted that if a different printing technique is used, both cuts can reach their respective edges.

Figure 3A:
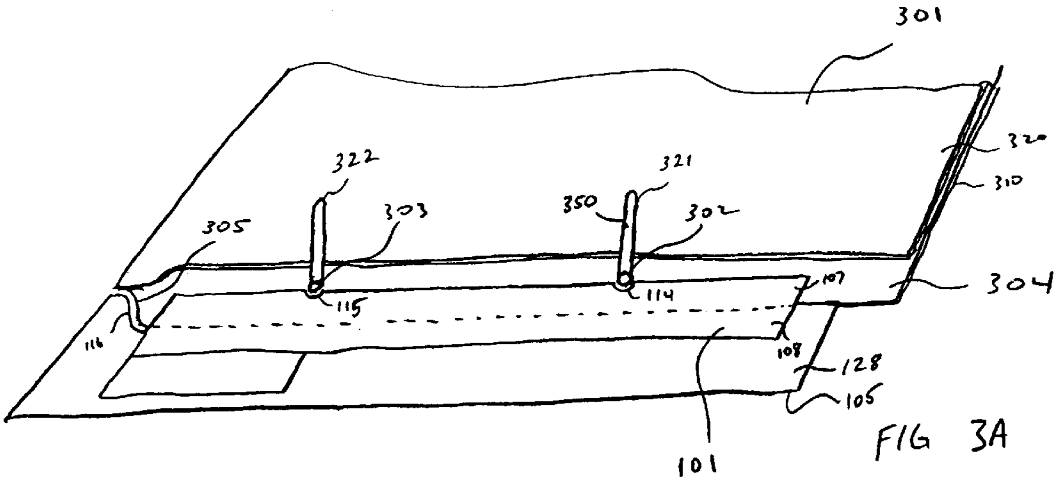
FIG. 3A is an isometric view showing the label of FIG. 1 being applied to an exemplary folder.
Figure 4:
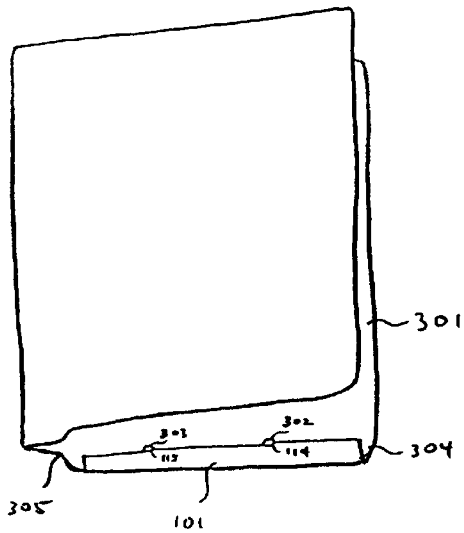
FIG. 4 shows the label of FIG. 3A after the label has been applied to the exemplary folder.

FIGS. 3A and 4 show one embodiment of a stock member, such as a file folder 301, for use with label form 100. Those skilled in the art will appreciate that the present system is applicable to many applications, including file folders, envelopes and other stock members. Folder 301 generally includes a main body having a portion, such as a tab 304, adapted to receive a label. In the exemplary embodiment, folder 301 includes a first flap 310 and a second flap 320. In one embodiment, first flap 310 includes tab 304 having a contoured portion 305. In some embodiments, tab 304 includes alignment guidance features, such as holes 302 and 303. These holes 302 and 303 align with and correspond to the alignment guidance features of label member 101, thus providing a physical, tactile and visual method of consistently aligning a label on a folder.

Exemplary Use of Label System

Figure 3B:
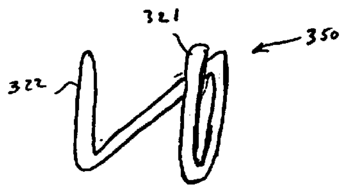
FIG. 3B is an isometric view of an exemplary guide member.

FIG. 3A shows an example of label member 101 being applied to tab 304 of file folder 301. As noted above, tab 304 includes alignment guidance features, such as holes 302 and 303. These holes align with and correspond to the tactile alignment guidance features of label member 101 when placing label member 101 onto tab 304. In the exemplary embodiment, a guide member 350 having alignment guidance features, such as a pair of parallel guiding pins 321 and 322, is utilized to hold the folder steady and to provide male members which provide physical and tactile guidance for helping in the alignment and placement of notches 114 and 115 with holes 302 and 303. FIG. 3B shows further details of exemplary guide member 350. In the exemplary embodiment, guide member 350 is a single piece of round wire bent into a shape so that guiding pins 321 and 322 are parallel and the same distance apart as holes 302 and 303. Alternatively, the shape of the wire is triangular if notches 114 and 115 are triangular, and so on.

As noted above, first side 104 and second side 105 of the backing member are each independently removable from label section 130 and label member 101. As shown in FIG. 3A, first side 104 has been removed along with first portion 127 of label section 130. Advantageously, this provides that half of label member 101 can be placed onto a folder or other object at a time. This provides that the label will not curl during application and it provides that the label will not inadvertently stick to the table or other undesirable object, since the user can control the unstuck portion and need not worry about the covered portion.

To apply label member 101, first side 104 of backing member 102 and first portion 127 of label section 130 are simultaneously removed from label member 101 so that tactile alignment guidance features 114 and 115 on label member 101 are exposed. Then the user aligns alignment guidance features 114 and 115 on label member 101 with the corresponding alignment guidance features 302 and 303 on folder 301. As discussed above, guidance pins 321 and 322 can also be used to assist in alignment. Another feature of the present system is that contoured cut 116 aligns with contoured portion 305 of folder 301. This provides a visual and tactile guide to assisting a user to consistently apply a label to a folder. As discussed above, although the exemplary embodiment shows a label form having both notches and a contoured cut, either feature can be used independently and can be incorporated into a label form by itself or in tandem.

After being aligned, first portion 107 of label member 101 is applied to the front of tab 304. Second side 105 of the backing member and second portion 128 of label section 130 are the simultaneously removed from second portion 108 of label member 101, and second portion 108 is then folded over the edge of tab 304 and applied to the other side of the tab so that the final result looks like the labeled folder 301 of FIG. 4, in which the two portions of the label member are applied at 180 degree angles relative to each other. Alternatively, depending on the folder tab design, the present method can be employed to apply a label member onto a flat surface.

In one embodiment, the present system can be used to greatly speed up a labeling system. For instance, a user can purchase a box of folders similar to folder 301, in which the folders are pre-stacked on a guide member 350 having a pair of guidance pins 321 and 322. The user can then apply the above label application system to the top folder in the stack, remove it, and continue on down the stack. Such a system greatly speeds up the process of consistently aligning labels to thousands of file folders.

Figure 5:
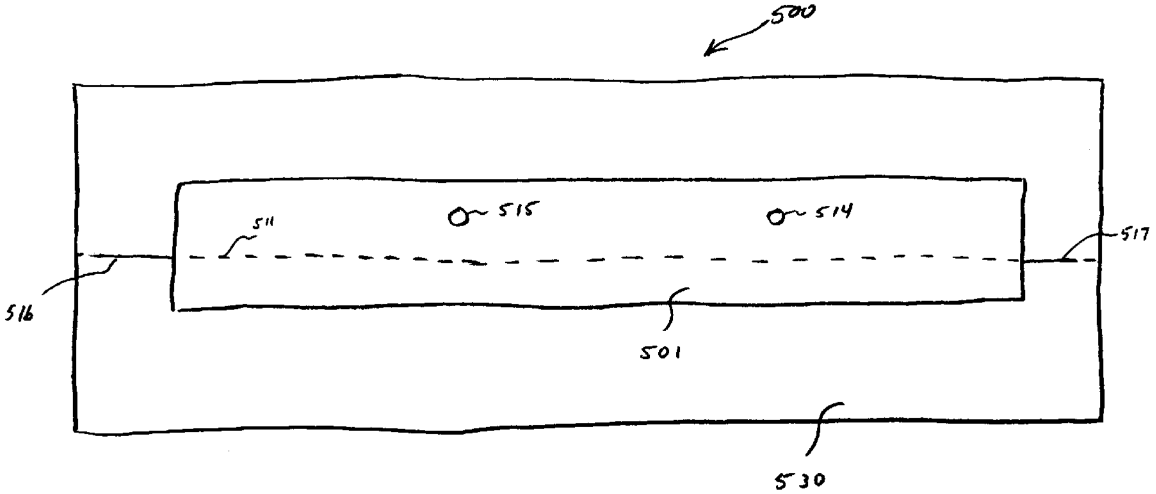
FIG. 5 shows a top view of another embodiment of a label form according to the present invention.

FIG. 5 shows another exemplary embodiment of a label form 500 according to the present invention. Label form 500 is substantially similar to label form 100 described above, and for sake of brevity, certain details will be omitted. Label form 500 includes a label section 530 removably attached to a backing member (not shown). Label section 530 includes a label member 501. Label section 530 also includes a tactile alignment feature. In the exemplary embodiment, the alignment guidance features are a first hole 514 and a second hole 515 cut within the inner surface area of label member 501. For purposes of the present description, the inner surface of label member 501 is defined as the area within the perimeter of the label member.

The backing member of label form 500 includes a first side and a second side. The two sides are separated by a split crack perforation 511. In the exemplary embodiment, label section 530 includes a first cut 516 and a second cut 517. These cuts follow and correspond to split crack perforation 511 and allow for easy removal of the first side of the backing member so that label member 501 is exposed. In the exemplary embodiment of FIG. 5, cuts 516 and 517 do not reach the edges of label section 530. This helps keep the whole label form together when the label is being printed on a printer. Alternatively, cuts 516 and 517 could reach the edges of label section 530, and perforation 511 of the backing member could be cut just short of the edges of the backing member. It is also noted that if a different printing technique is used, both cuts can reach their respective edges.

Figure 6:
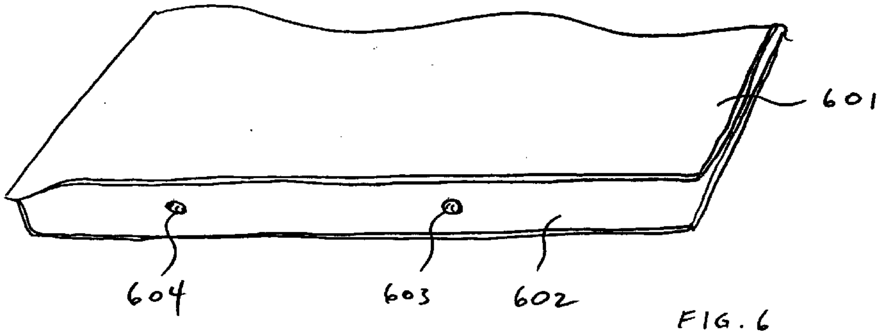
FIG. 6 shows an isometric view of one embodiment of a folder for use with the label form of FIG. 5.

FIG. 6 shows an exemplary stock member, a folder 601. Folder 601 has a main body which includes a portion, such as a tab 602, adapted to receive a label. Tab 602 includes a pair of tactile alignment guidance features, a pair of dimples 603 and 604. These dimples 603 and 604 are slightly raised portions of tab 602. They correspond to and provide a male alignment member to align and mate with the female alignment member provides by first hole 514 and second hole 515 of label form 500. They provide tactile and visual guidance for providing a user to align label member 501 consistently onto folder 601.

To apply label member 501 to stock member 601, the first side of the backing member is removed from label member 101 so that tactile alignment guidance features 514 and 515 on label member 501 are exposed. Then the user aligns alignment guidance features 514 and 515 on label member 501 with the corresponding alignment guidance features 603 and 604 on folder 501. The alignment guidance features on both members provide a visual and tactile guide to assisting a user to consistently apply a label to a folder. The first portion of the label member is applied to the front of tab 602. The second side of the backing member is then removed from the second portion of the label member, and the second portion of the label member is then folded over the edge of the tab and applied to the other side of the tab. Alternatively, the present method can be employed to apply a label member onto a flat surface.

Figure 7:
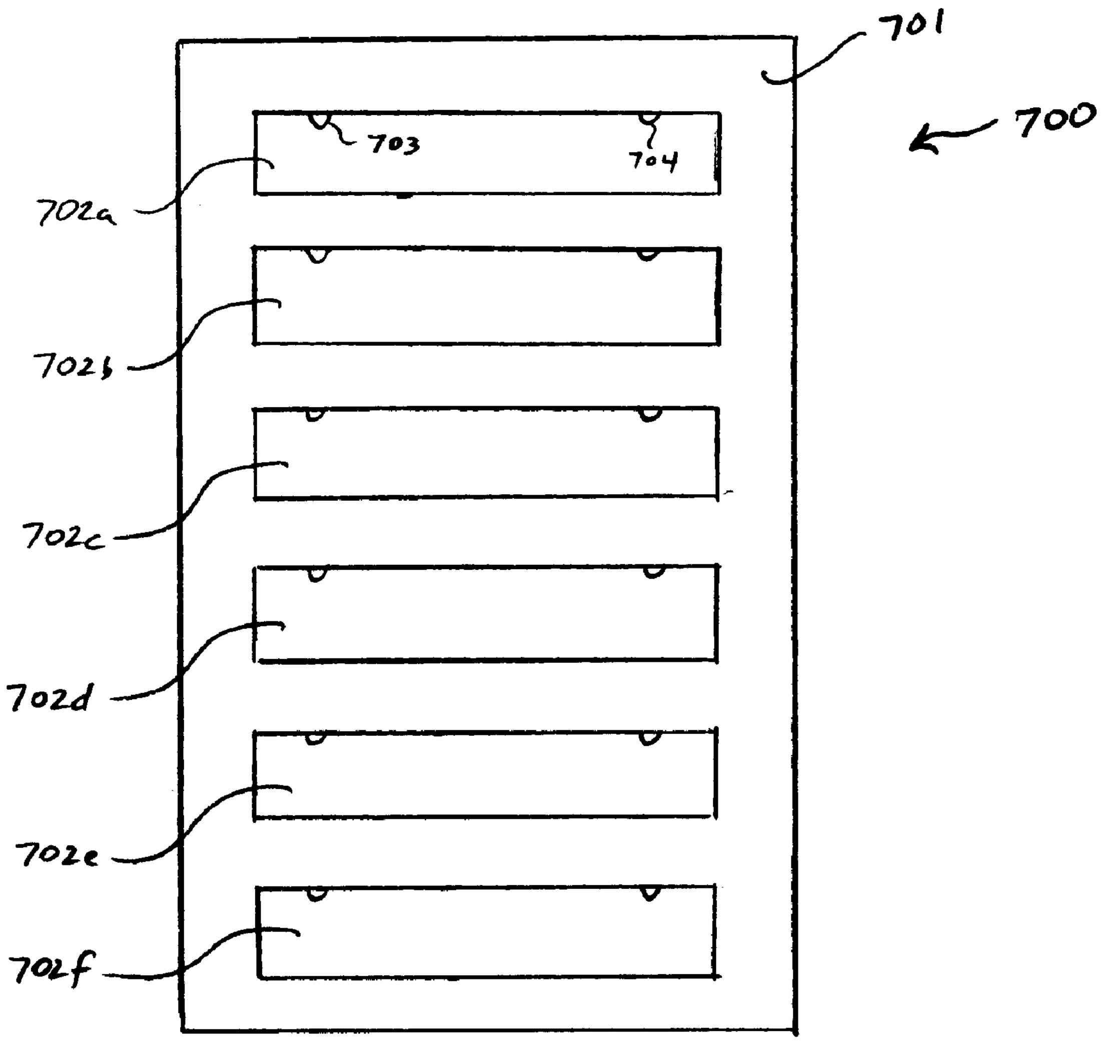
FIG. 7 shows a top view of another embodiment of a label form according to the present invention.

FIG. 7 shows another exemplary embodiment of a label form 700 according to the present invention. Label form 700 is similar in may respects to label forms 100 and 500 described above, and for sake of brevity, certain details will be omitted. Label form 700 includes a label section 701 removably attached to a backing member (not shown). In the exemplary embodiment, label section 701 includes a series of label members 702*a*–702*f*. Label section 530 also includes a plurality of tactile alignment guidance features. In the exemplary embodiment, the alignment guidance features are a first notch 703 and a second notch 704 cut into the edge of each label member 702*a*–702*f*.

In the exemplary embodiment, each label member 702*a*–702*f* can be removed from the backing member and alignment guidance features 703 and 704 on the label member are aligned with corresponding alignment guidance features on a stock member as described above. The alignment guidance features on both members provide a visual and tactile guide to assisting a user to consistently apply a label to a folder.

In another embodiment, label form 700 includes a backing member having a series of split crack perforations (not shown) located under each label member 502*a*–502*f*, each perforation similar to the split crack perforations described above for label forms 100 and 500. In such an embodiment, a first side of the backing member is removed from each label member so that tactile alignment guidance features 703 and 704 on the label member are exposed. Then the user aligns alignment guidance features 703 and 704 on label member with corresponding alignment guidance features on a stock member, such as a folder. A first portion of the label member is applied to the front of the folder tab. A second side of the backing member is then removed from a second portion of the label member, and the second portion of the label member is then folded over the edge of the tab and applied to the other side of the tab. The user continues down the series of labels members 702*a*–702*f*, applying them in sequence.

It is noted that the features of the different embodiments described above can be used in various permutations (ie. the notches of label form 100 can be used with the dimples of folder 601, etc.), and that the present description is merely an exemplary discussion of the present invention. It is also noted that although the labels described above included female tactile alignment features and the folders includes male tactile alignment features, those skilled in the art will appreciate that, in some embodiments, the label section alignment features can be male members and that the stock member can include either male or female members and that these features can also be varied according to other design factors.

Conclusion

The present invention provides a label, system, and method for assisting a user to consistently apply and align labels, it also provides a means to prevent the curling of the label after a side of the backing has been removed. Advantageously, tactile alignment features on the folder and corresponding tactile alignment features on the label help assure that each label will be applied quickly, consistently, and with the same alignment as the labels applied before and after.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A label form comprising:

a backing member; and a label section removably attached to the backing member, the label section having a top side adapted for being printed on, the label section comprising at least one label member;

wherein, the label section having at least one physically distinct tactile alignment guidance feature for aligning the at least one label member on a stock member having a corresponding alignment guidance feature.

2. The label form of claim 1, wherein the at least one tactile alignment guidance feature of the label section comprises at least one notch on an edge of the label member.

3. The label form of claim 1, wherein the at least one tactile alignment guidance feature on the label section is adapted to physically mate with the corresponding tactile alignment guidance feature on the stock member.

4. The label form of claim 1, wherein the at least one tactile alignment guidance feature of the label section comprises at least one hole on an inner surface area of the label member.

5. The label form of claim 1, wherein the at least one tactile alignment guidance feature of the label section is adapted to physically align with at least one dimple on the stock member.

6. The label form of claim 1, wherein the at least one tactile alignment guidance feature of the label section comprises a contoured cut of the label section.

7. The label form of claim 1, wherein the at least one tactile alignment guidance feature of the label section is adapted to physically align with a contoured cut on a stock member.

8. The label form of claim 1, wherein the label section comprises two or more label members, and wherein the at least one tactile alignment guidance feature of the label section comprises at least one notch on an edge of each of the two or more label members.

9. A label form comprising:

a label section having at least one alignment guidance feature for aligning with a corresponding alignment guidance feature on a stock member; and a backing member removably attached to the label section, the backing member having a first side and a second side, each of the first side and second side removable from the label section independently, wherein the backing member overlaps the alignment guidance feature such that the alignment guidance feature is only usable to align the label section upon the stock member after one of the first side or the second side of the backing member is removed from the label section.

10. The label form of claim 9, wherein the label section includes a label member, the at least one alignment guidance feature comprises at least one notch cut into an edge of the label member, and wherein the at least one notch is exposed when the first side of the backing member is removed from the label section.

11. The label form of claim 9, wherein the label section includes a label member, the at least one alignment guidance feature comprises at least one hole cut into an inner surface area of the label member, and wherein the at least one hole is adapted to physically align with at least one dimple on the stock member.

12. The label form of claim 9, wherein the at least one alignment guidance feature comprises a contoured cut of the label section, and wherein the contoured cut is exposed when the first side of the backing member is removed from the label section.

13. The label form of claim 9, wherein the label section includes at least one label member, the at least one label member having a first portion and a second portion, and wherein the second side of the backing member is attached to the second portion of the label member and the first portion of the backing member is attached to the first portion of the label member.

14. The label form of claim 9, wherein the label section comprising a top side adapted for being printed upon and a bottom side having an adhesive applied thereon, the label section having a first portion comprising approximately a first half of the label section and a second portion comprising approximately a second half of the label section, and wherein the backing member first side removably attached to the first portion of the label member and the backing member second side removably attached to the second portion of the label member.

15. The label form of claim 9, wherein the backing member includes a perforation separating the first side of the backing member from the second side of the backing member.

16. The label form of claim 15, wherein the label section includes a perforation at least partially corresponding to the backing member perforation.

17. The label form of claim 15, wherein the label section includes a first perforation at least partially corresponding to the backing member perforation, the first perforation near a first edge of the label section, and wherein the label section includes a second perforation at least partially corresponding to the backing member perforation, the second perforation near a second edge of the label section.

18. A label form comprising:

a label section comprising a top side adapted for being printed on and a bottom side having an adhesive applied thereon, the label section having a first portion and a second portion; and a backing member removably attached to the label section, the backing member having a first side and a second side, each of the first side and second side removable from the label section independently;

wherein when the first side is removed, the adhesive on the bottom side of the label section first portion is exposed.

19. The label form of claim 18, wherein the label section includes a label member, and wherein when the first side of the backing member is removed from the label section and the second side is still attached to the label section, the second side provides a holding section for holding a non-adhesive portion of the label section.

20. The label form of claim 18, wherein the label section includes at least one label member, the at least one label member having a first portion and a second portion, and wherein the second side of the backing member is attached to the second portion of the label member and the first portion of the backing member is attached to the first portion of the label member.

21. The label form of claim 18, wherein the label section having a first portion comprising approximately a first half of the label section and a second portion comprising approximately a second half of the label section, and wherein the backing member first side removably attached to the first portion of the label member and the backing member second side removably attached to the second portion of the label member.

22. The label form of claim 18, wherein the backing member includes a perforation separating the first side of the backing member from the second side of the backing member.

23. The label form of claim 22, wherein the label section includes a perforation at least partially corresponding to the backing member perforation.

24. The label form of claim 22, wherein the label section includes a first perforation at least partially corresponding to the backing member perforation, the first perforation near a first edge of the label section, and wherein the label section includes a second perforation at least partially corresponding to the backing member perforation, the second perforation near a second edge of the label section.

25. A stock member comprising:

a main body having a portion adapted to receive a label member;

wherein, the portion having at least one physically distinct tactile alignment guidance feature, the tactile alignment guidance feature corresponding to a corresponding tactile alignment guidance feature on the label member so that the label member can be aligned on the portion.

26. The stock member of claim 25, wherein the at least one tactile alignment guidance feature of the portion includes at least one dimple on the portion.

27. The stock member of claim 25, wherein the at least one tactile alignment guidance feature of the portion includes at least one hole in the portion.

28. The stock member of claim 27, wherein the at least one hole is adapted to receive a guide member having at least one guide pin, the at least one guide pin adapted for providing a physical alignment guide for the label member tactile alignment guidance feature.

29. A labeling system, comprising:

a label section having at least one physically distinct tactile alignment guidance feature; and a stock member having at least one physically distinct tactile alignment guidance feature, the stock member tactile alignment guidance feature corresponding to the label member tactile alignment guidance feature.

30. The labeling system of claim 29, wherein the label section includes a label member, the at least one label section tactile alignment guidance feature comprises at least one notch cut into an edge of the label member, and wherein the stock member at least one tactile alignment guidance feature comprises at least one hole, the at least one notch adapted to physically align with the at least one hole.

31. The labeling system of claim 30, further comprising a guide member having at least one guide pin, the at least one guide pin adapted to fit within the at least one hole of the stock member for providing a physical alignment guide for the label member at least one notch.

32. The labeling system of claim 29, wherein the label section includes a label member, the label section at least one tactile alignment guidance feature comprises at least one hole cut into an inner surface area of the label member, and wherein the stock member at least one tactile alignment guidance feature comprises at least one dimple on the stock member, the at least one hole adapted to physically align with the at least one dimple.

33. The labeling system of claim 29, wherein the label section at least one tactile alignment guidance feature comprises a contoured cut on the label section, and wherein the stock member at least one tactile alignment guidance feature comprises a contoured cut on the stock member corresponding to the contoured cut of the label section.

34. The labeling system of claim 29, wherein the label section having a first portion and a second portion, and further comprising a backing member removably attached to the label section, the backing member comprising a first side removably attached to the first portion of the label section and a second side removably attached to the second portion of the label section, wherein each of the first side and second side removable from the label section independently of the other side.

35. The labeling system of claim 34 wherein when the first side of the backing member is removed from the label section the at least one tactile alignment guidance feature on the label section is exposed so that the label section at least one tactile alignment guidance feature can be aligned with the corresponding stock member at least one tactile alignment guidance feature.

36. A method for applying a label to a stock member, the method comprising the steps of:

aligning a physically distinct tactile alignment guidance feature on the label with a corresponding tactile alignment guidance feature on the stock member; and applying the label to the stock member.

37. A method for applying a label to a stock member, the method comprising the steps of:

providing a label form comprising:

a label section having a first portion and a second portion, the label section includes at least one tactile alignment guidance feature, and a backing member comprising a first side and a second side, the second side of the backing member removably attached to the second portion of the label section and the first side of the backing member removably attached to the first portion of the label section, wherein each of the first side and second side removable from the label section independently of the other section;

providing a stock member having at least one tactile alignment guidance feature, the stock member at least one tactile alignment guidance feature corresponding to the at least one tactile alignment feature of the label section;

removing the first side of the backing member from the label section so that the alignment guidance feature on the label section is exposed;

aligning the alignment guidance feature on the label section with the corresponding alignment guidance feature on the stock member;

applying the first portion of the label section to the stock member;

removing the second section of the backing member from the second portion of the label section; and applying the second portion of the label section to the stock member.

38. The method of claim 37, wherein the second portion of the label section is folded over an edge of the stock member before it is applied to the stock member.

39. A label form comprising:

a backing member; and a label member removably attached to the backing member, the label section having a top side adapted for being printed on; and a physically distinct alignment guidance feature to align the label member on a stock member which has a corresponding physically distinct alignment guidance feature, wherein the label form physically distinct alignment guidance feature is usable to align the at least one label member on the stock member after a portion of the backing member is removed from the label member.

40. The label form of claim 39, wherein the label form physically distinct alignment guidance feature includes at least one notch on a front edge of the label member.

41. The label form of claim 39, wherein the label form physically distinct alignment guidance feature includes a contoured edge of a first portion of the backing member which is exposed after a second portion of the backing member is removed from the label member.

* * * * *